United States Patent Office 3,496,168
Patented Feb. 17, 1970

3,496,168
4-ALKOXYESTRADIOLS
James F. Kerwin, Broomall, Pa., assignor to Smith Kline & French Laboratories, Philadelphia, Pa., a corporation of Pennsylvania
No Drawing. Filed Sept. 12, 1967, Ser. No. 667,069
Int. Cl. C07c *169/08, 167/30;* A61k *17/00*
U.S. Cl. 260—239.55           8 Claims

ABSTRACT OF THE DISCLOSURE 4-alkoxyestradiols are prepared by treating a 4-chloro-19-nortestosterone with an alcohol in the presence of base and then dehydrogenating in the presence of palladium on charcoal. The products have cholesterol-lowering activity.

---

This invention relates to steroid compounds useful in lowering blood cholesterol levels. In particular, the invention relates to 4-alkoxyestradiols.

The compounds of the invention are characterized by the following structural formula:

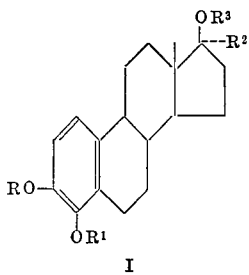

I wherein

R is hydrogen or lower alkyl of up to 4 carbon atoms;
$R^1$ is lower alkyl of up to 4 carbon atoms;
$R^2$ is hydrogen, methyl, ethyl, or ethynyl; and
$R^3$ is hydrogen, lower alkanoyl of up to 4 carbon atoms, cyclopentenyl, or tetrahydropyranyl, with the proviso that when $R^2$ is methyl, ethyl, or ethynyl, $R^3$ is hydrogen or lower alkanoyl.

The compounds of the invention are prepared from a 4-chloro-19-nortestosterone such as 4-chloro-19-nortestosterone acetate. Reaction at room temperature with a lower alcohol such as methanol, ethanol, propanol, or butanol in the presence of a base such as an alkali metal hydroxide gives the 4-lower alkoxytestosterone, the A-ring of which is dehydrogenated by refluxing in a high-boiling solvent such as mesitylene in the presence of a catalyst such as palladium on charcoal.

Compounds in which $R^2$ is methyl, ethyl, or ethynyl are prepared by using as a starting material the appropriate 4-chloro-17α-substituted compound. Alkylation of the 3-hydroxy group to give ethers in which R is lower alkyl is accomplished by treatment of a 3-hydroxy-4-alkoxyestradiol compound with dimethyl sulfate or a lower alkyl halide in the presence of a base such as potassium carbonate.

When $R^2$ is hydrogen, the invention also comprehends the 17-cyclopentenyl and tetrahydropyranyl ethers. These compounds are prepared by treating a 4-alkoxy-19-nortestosterone with cyclopentanone diethyl ketal or dihydropyran in the presence of p-toluenesulfonic acid and then dehydrogenating the A-ring.

The 17-esters are similarly prepared by acylation of a 4-alkoxy-19-nortestosterone with an anhydride or acyl halide and then dehydrogenating.

The compounds of the invention have been found to lower plasma cholesterol levels at doses of 2–4 mg./kg. in rats when evaluated in standard test procedures. The preferred compound, 4-methoxyestradiol 3-methyl ether (I, R, $R^1$=CH$_3$, $R^2$, $R^3$=H), exerts a highly significant plasma cholesterol-lowering effect in rats when administered subcutaneously at a dose of 2.0 mg./kg. in sesame oil, without causing feminization. Another preferred compound, 4-methoxyestradiol, produced a significant plasma cholesterol-lowering effect at 2 and 4 mg./kg.

The compounds are formulated for use in lowering blood cholesterol levels in warm-blooded mammals by incorporating them into tablets, capsules, or injectables according to conventional pharmaceutical practice. The amount of the active ingredient will vary according to the weight of the subject, the extent of the cholesterol-lowering effect desired, and other factors within the judgment of those skilled in the administration of drugs. Among the excipients which may be used are lactose, sucrose, magnesium stearate, stearic acid, starch, terra alga, gelatin, and acacia.

Those skilled in the art of medicinal chemistry will be aware of minor and obvious changes which can be made in the compounds and processes of the invention. Such variants, being within the bounds of ordinary skill, are considered equivalent to the invention as specifically claimed.

The following examples are intended to illustrate the preparation of the compounds of the invention, but are not intended to limit the scope thereof. All temperatures given are in degree centigrade.

EXAMPLE 1

4-methoxyestradiol (a) A suspension of 10.5 g. (0.03 mole) of 4-chloro-19-nortestosterone acetate in a 1% KOH-methanol solution (400 ml.) is stirred at room temperature under nitrogen for a 24-hour period. The mixture is concentrated under reduced pressure, diluted with water, and the aqueous mixture thoroughly extracted with methylene chloride. The dried organic phase is concentrated to an oil and this residue crystallized from aqueous acetone. The mother liquor is concentrated and filtered through an alumina column (activity III), eluting with 1:1 benzene-methylene chloride. The combined crystalline material is recrystallized from aqueous acetone to give 4-methoxy-19-nortestosterone, M.P. 160–162°.

(b) A solution of 1.0 g. (3 mmoles) of this compound in 200 ml. of mesitylene and 250 mg. of 5% Pd on C are refluxed for 24 hours. The catalyst is filtered off and the phenolic material extracted from the mesitylene with 50% aqueous alcoholic KOH. The alkaline phase is acidified with glacial acetic acid and the acidic solution thoroughly extracted with methylene chloride. The dried organic phase is concentrated under reduced pressure to give a solid which is dissolved in 8 ml. of alcohol and 2 ml. of acetic acid and treated with 1.0 g. of Girard "T" reagent. The mixture is refluxed for 45 minutes, concentrated under reduced pressure, and diluted with water. Extraction of the aqueous mixture with ether and subsequent drying and concentrating gives the title product, recrystallized from methanol: M.P. 167–169°.

EXAMPLE 2

4-methoxyestradiol 3-methyl ether

To 1.0 g. of 4-methoxyestradiol and 5.5 g. of $K_2CO_3$ in 80 ml. of acetone is added 2.5 ml. of dimethyl sulfate. The reaction mixture is refluxed under nitrogen for 2½ hours. The cooled mixture is filtered and the filtrate concentrated. The residue is diluted with a small volume of methanol, made alkaline with 10% NaOH, and diluted further with water. The alkali insoluble material was extracted into methylene chloride, the extracts dried and evaporated, and the residual product recrystallized from aqueous methanol; M.P. 181–183°.

EXAMPLE 3

When ethanol, propanol, or butanol are substituted for methanol in the procedure of Example 1(a) and the dehydrogenation reaction then carried out as described in Example 1(b), 4-ethoxyestradiol, 4-propoxyestradiol, and 4-butoxyestradiol are obtained respectively.

EXAMPLE 4

When 4-methoxyestradiol is treated with ethyl iodide, propyl iodide, or butyl iodide instead of dimethyl sulfate according to the procedure of Example 2, 4-methoxyestradiol 3-ethyl, propyl, or butyl ether are obtained respectively.

EXAMPLE 5

When 4-chloro-17α-methyl-19-nortestosterone acetate, 4-chloro-17α-ethyl-19-nortestosterone acetate, or 4-chloro-17α-ethynyl-19-nortestosterone acetate are each treated with 1% KOH-methanol solution as described in Example 1(a) and then dehydrogenated as described in Example 1(b), 4-methoxy-17α-methylestradiol, 4-methoxy-17α-ethylestradiol, and 4-methoxy-17α-ethynylestradiol are obtained respectively.

Treatment with dimethyl sulfate or a lower alkyl iodide gives the 3-methyl or other lower alkyl ether.

EXAMPLE 6

4-methoxyestradiol 17-(1-cyclopentenyl) ether

A mixture of 2 g. of 4-methoxy-19-nortestosterone, 5 ml. of cyclopentanone diethyl ketal, and a catalytic amount of p-toluenesulfonic acid is placed in a flask with a water trap and heated at 150–175° (bath temperature) until no more distillation occurs. The residue is cooled and the cyclopentenyl ether of 4-methoxy-19-nortestosterone isolated by adding water and filtering or by extracting with a solvent such as ether or chloroform.

This compound is then dehydrogenated according to the procedure of Example 1(b) to give the title compound.

EXAMPLE 7

4-methoxyestradiol 17-(2-tetrahydropyranyl) ether

A mixture of 1 g. of 4-methoxy-19-nortestosterone, an excess of dihydropyran, and a catalytic amount of p-toluenesulfonic acid in benzene is refluxed for a short period of time. The resulting solution is diluted with benzene, extracted with 5% NaHCO₃ solution and water, dried and evaporated to give the tetrahydropyranyl ether of 4-methoxy-19-nortestosterone.

This compound is then dehydrogenated according to the procedure of Example 1(b) to give the title compound.

EXAMPLE 8

4-methoxyestradiol 17-acetate

A mixture of 5 g. of 4-methoxy-19-nortestosterone, 20 ml. of pyridine, and 10 ml. of acetic anhydride is warmed to effect complete solution and then allowed to sit overnight at room temperature. The mixture is then poured into ice water and the 17-acetate of 4-methoxy-19-nortestosterone isolated by filtration or by extraction with a solvent such as ether or chloroform.

This compound is then dehydrogenated according to the procedure of Example 1(b) to give the title product.

Esterification with propionic or butyric anhydrides or with acyl halides instead of acetic anhydride gives the corresponding 17-ester which is then dehydrogenated to give the product.

EXAMPLE 9

When 4-methoxyestradiol 3-methyl ether is refluxed in benzene with an excess of tetrahydropyran and a catalytic amount of p-toluenesulfonic acid for a short period of time, and the reaction mixture worked up as described in Example 7, 4-methoxyestradiol 3-methyl ether 17-(2-tetrahydropyranyl)-ether is obtained.

When 4-methoxyestradiol 3-methyl ether is allowed to set overnight in pyridine solution with acetic anhydride and the mixture worked up as described in Example 8, 4-methoxyestradiol 3-methyl ether 17-acetate is obtained.

I claim:
1. A compound of the formula

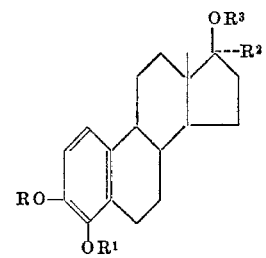

wherein
R is hydrogen or lower alkyl of up to 4 carbon atoms;
R¹ is lower alkyl of up to 4 carbon atoms;
R² is hydrogen, methyl, ethyl, or ethynyl; and
R³ is hydrogen, lower alkanoyl of up to 4 carbon atoms, cyclopentenyl, or tetrahydropyranyl, with the proviso that when R² is methyl, ethyl, or ethynyl, R³ is hydrogen or lower alkanoyl.

2. A compound according to claim 1 in which R² is hydrogen.
3. A compound according to claim 1 in which R³ is hydrogen.
4. A compound according to claim 3 in which R² is hydrogen.
5. A compound according to claim 4, being the compound 4-methoxyestradiol.
6. A compound according to claim 4, being the compound 4-methoxyestradiol 3-methyl ether.
7. A compound according to claim 2, being the compound 4-methoxyestradiol 3-methyl ether 17-(2-tetrahydropyranyl)ether.
8. A compound according to claim 2, being the compound 4-methoxyestradiol 3-methyl ether 17-acetate.

References Cited

UNITED STATES PATENTS 2,280,828    2/1942    Inhoffen _____ 260—397.2

OTHER REFERENCES

Conrow et al.: Steroids, March 1967, pp. 307–326, pp. 307 and 311 pertinent.

Kaneko, H. et al.: Chem. Pharm. Bull'n, vol. 12, 1964, pp. 196–203.

LEWIS GOTTS, Primary Examiner

ETHEL G. LOVE, Assistant Examiner

U.S. Cl. X.R.

260—397.4, 397.5; 424—238, 241